Oct. 30, 1962 J. R. HAMILTON 3,060,707
TRANSFER AND INVERT-REVERT MECHANISM FOR GLASS MACHINES
Filed July 5, 1957 4 Sheets-Sheet 1

INVENTOR:
Joseph R. Hamilton,
BY Bair, Freeman & Molinare
ATTORNEYS.

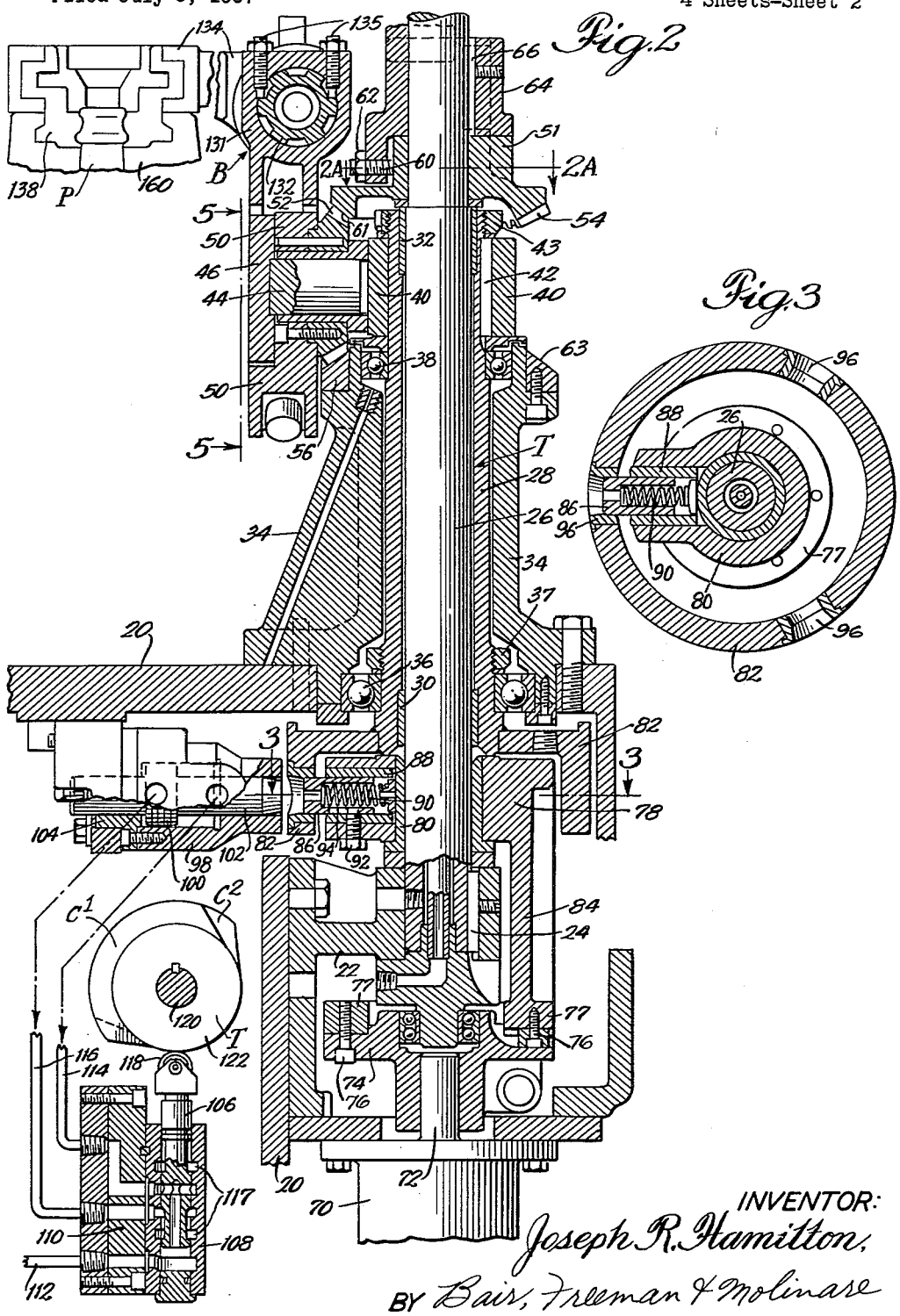

Oct. 30, 1962  J. R. HAMILTON  3,060,707
TRANSFER AND INVERT-REVERT MECHANISM FOR GLASS MACHINES
Filed July 5, 1957  4 Sheets-Sheet 3
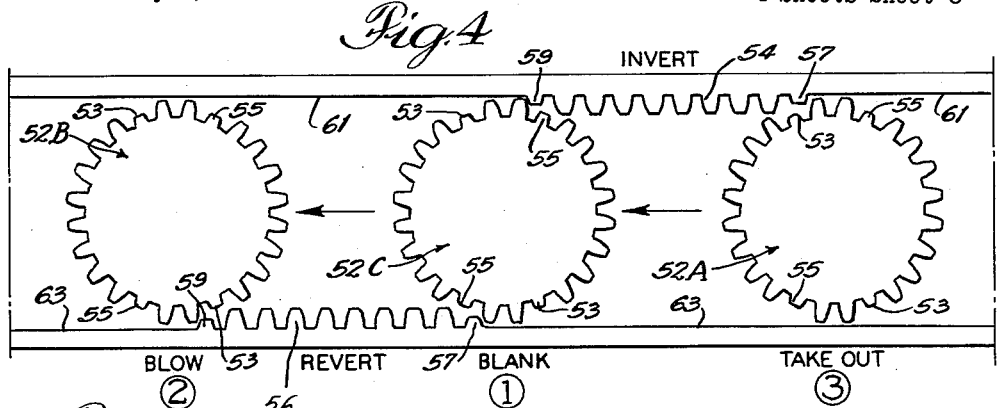
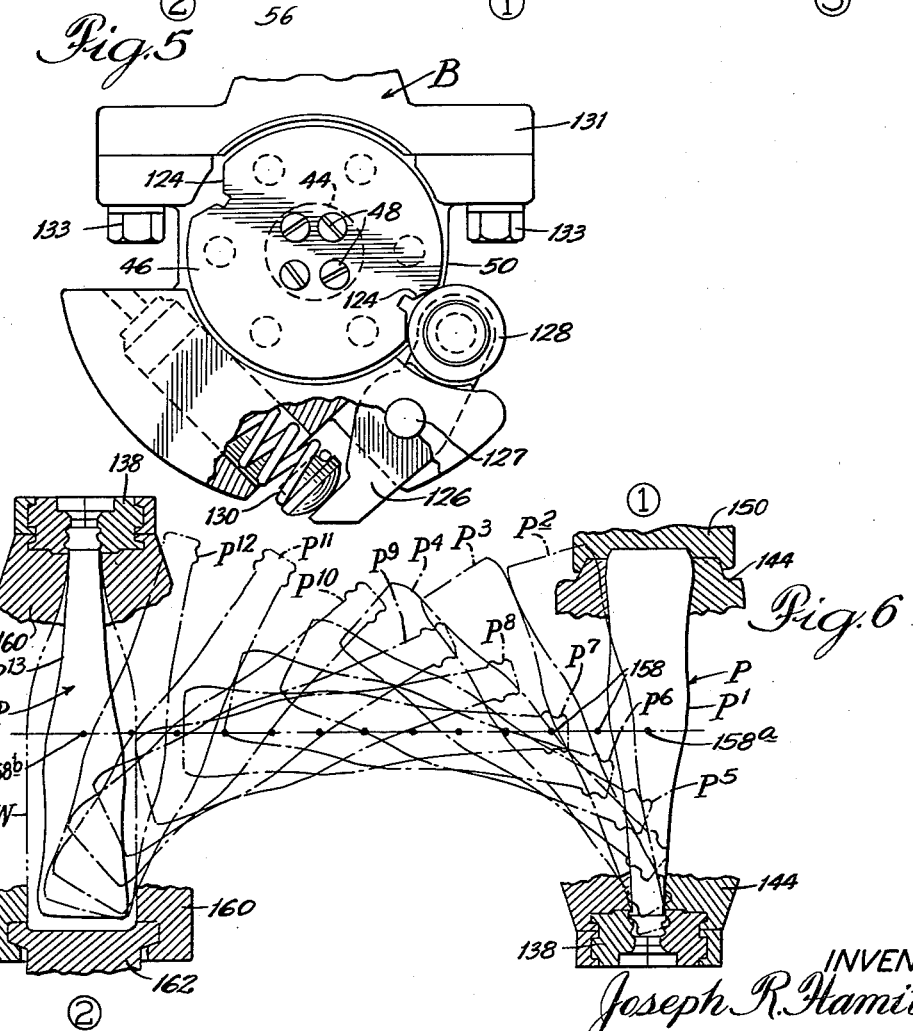
INVENTOR:
Joseph R. Hamilton,
BY Bair, Freeman & Molinare
ATTORNEYS.

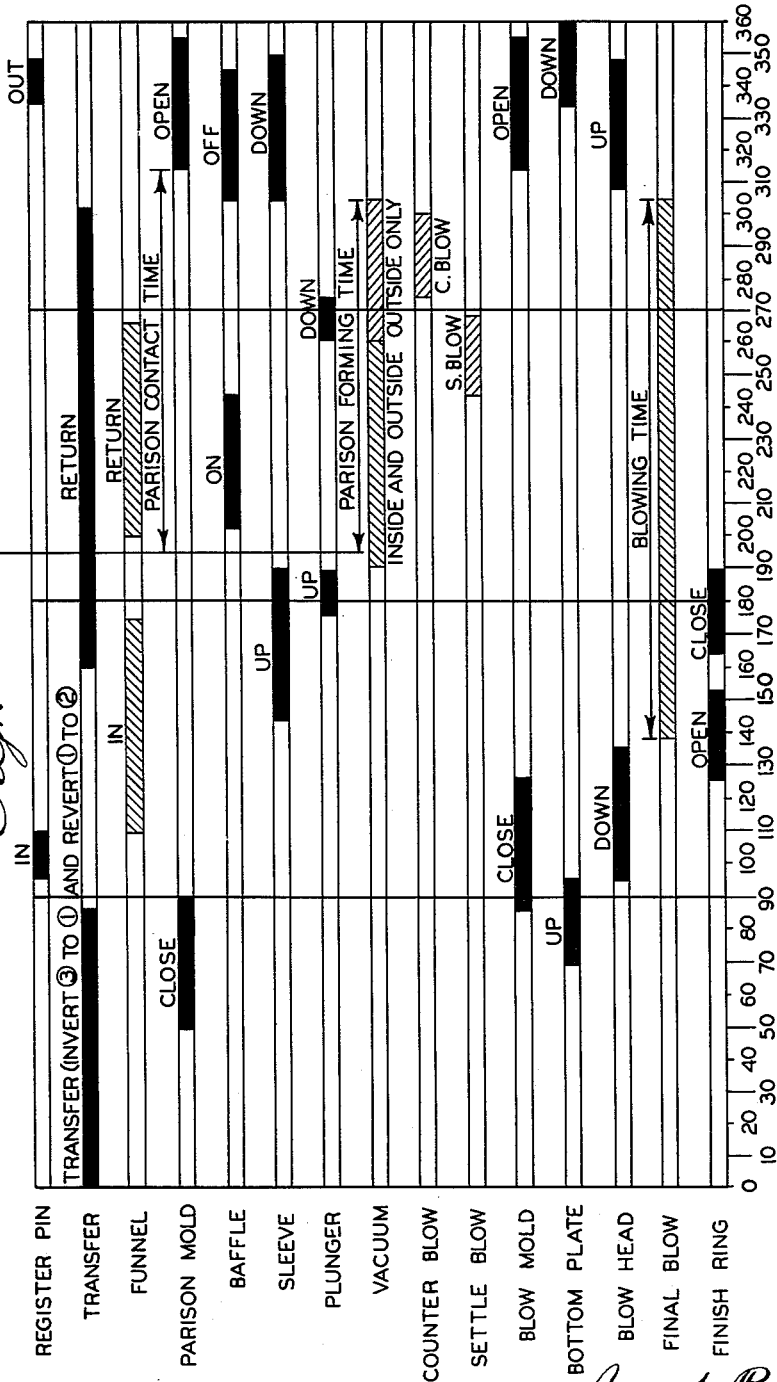

3,060,707
Patented Oct. 30, 1962

3,060,707
TRANSFER AND INVERT-REVERT MECHANISM
FOR GLASS MACHINES
Joseph R. Hamilton, Anderson, Ind., assignor to Lynch Corporation, Anderson, Ind., a corporation of Indiana
Filed July 5, 1957, Ser. No. 670,159
3 Claims. (Cl. 65—236)

This invention relates to an improved transfer and invert-revert mechanism for glassware forming machines of the type shown in the co-pending application of Harold A. Youkers, Serial No. 456,981, filed September 20, 1954, now Patent No. 2,874,516, dated February 24, 1959.

One object of the present invention is to provide a transfer mechanism for the type of glass machine shown in the Youkers application which is a hydraulically operated machine of the type provided with a three-finish ring mechanism mounted on a turret that is advanced in sequence from the parison forming operation to the final blow station and then to the take-out station, and in which the turret indexes to three stations 120° apart, namely, a blank station (at which the finish ring, the blank mold and the blank are reverted and inverted), a blow station and a take-out station. In the present invention the invert of the finish ring is accomplished during the transfer period between the take-out station and the blank station, and the revert of the finish ring and the blank or parison is accomplished during the transfer period between the blank station and the blow station. Thus, revert and invert are accomplished "on the fly" instead of both operations being performed at the blank station while the turret is stationary as in the Youkers disclosure.

Another object is to provide a mechanism in which invert and transfer are accomplished simultaneously and likewise revert and transfer are accomplished simultaneously, thus utilizing the transfer time for invert and revert and shortening the operating cycle by eliminating the necessity of invert and revert at the blank station while the blank or parison mold is stationary.

Still another object is to increase the time available for invert and revert by accomplishing these operations during transfer as distinguished from crowding them with many other operations such as funnel, charge, baffle and counterblow operations into the period of time allotted for the neck ring to be at the blank station.

A further object is to minimize the operating diameter of a turret of a glassware forming machine by designing mechanism for invert and revert operations during transfer as distinguished from inversion and reversion at the blank station, and at the same time to provide a reversion path for the freshly formed parison which minimizes whip of either the top or bottom thereof and thus minimizes the effects of centrifugal force which tends to deform the parison from its freshly formed shape in the blank mold, the arrangement being such that the parison is rotated top for bottom about an axis substantially midway between the upper and lower ends thereof.

With these and other objects in view, my invention consists in the construction, arrangement and combination of the various parts of my transfer and invert-revert mechanism for glassware forming machines, whereby the objects above contemplated are attained, as hereinafter more fully set forth, pointed out in my claims and illustrated in detail on the accompanying drawings, wherein:

FIG. 2 is an enlarged vertical sectional view thereof on the line 2—2 of FIG. 1;

FIG. 3 is a horizontal sectional view on the line 3—3 of FIG. 2 illustrating an indexing mechanism for the turret and associated actuating apparatus;

FIG. 4 is a developed view of the gear teeth on stationary invert and revert gears and three coacting finish ring carrier gears;

FIG. 5 is a front elevation on the indicated line 5—5 of FIG. 2 showing a detent means operable in connection with each of the finish ring carrier gears illustrated in FIG. 4;

FIG. 6 is a diagrammatic view showing the pattern of movement of a parison when reverted in accordance with my transfer and invert-revert mechanism; and FIG. 7 is a diagram of a typical timing cycle for a glassware forming machine in which my transfer and invert-revert mechanism is used.

Figure 1:
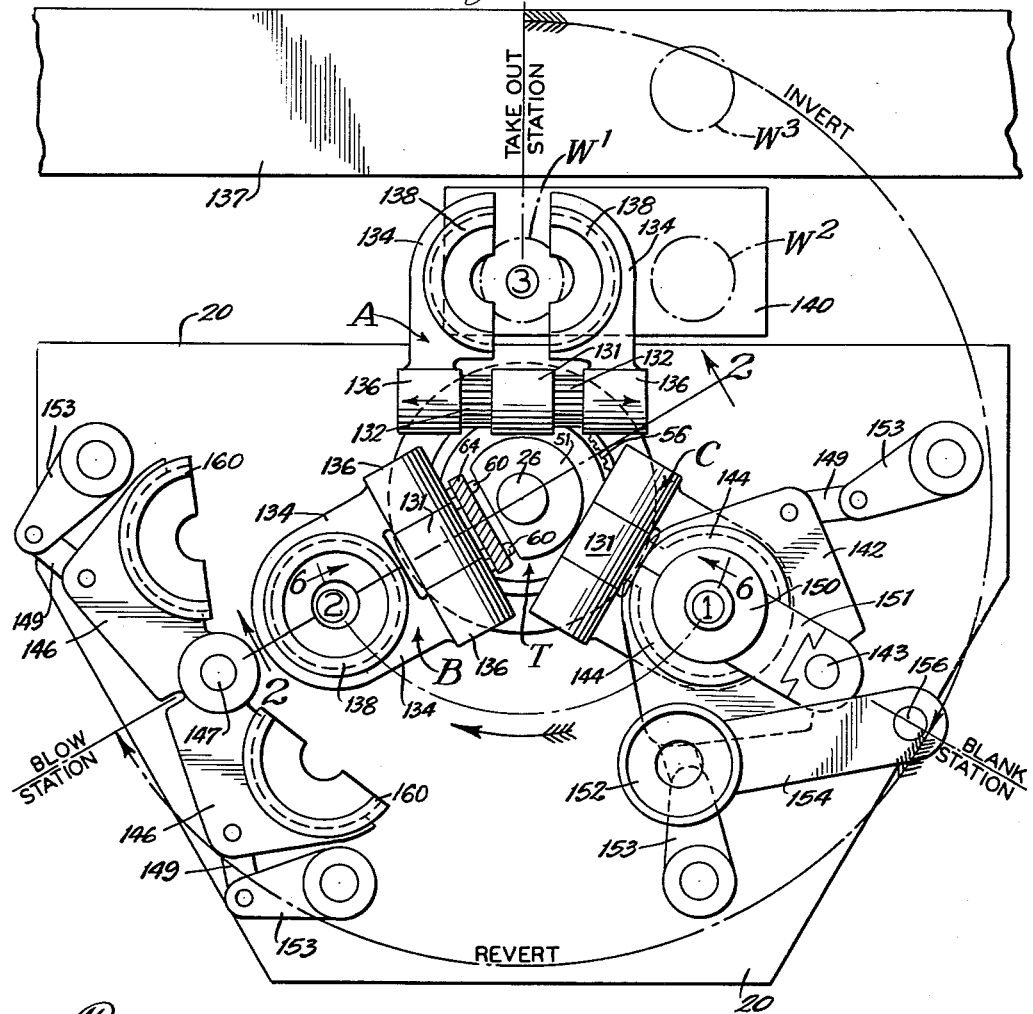
FIG. 1 is a plan view of a glassware forming machine utilizing my transfer and invert-revert mechanism.

On the accompanying drawings, I have used the reference numeral 20 to indicate a case in which hydraulic mechanism is mounted and which serves as a base for a turret shown generally at T. As shown in FIG. 1, the turret T has three neck ring carriers shown generally as A, B and C, and which are shown at stations (3), (2) and (1) respectively. The turret rotates intermittently clockwise (referred to as "transfer") so that in subsequent operations the neck ring carriers A, B and C will be at stations (1), (3) and (2) respectively, then stations (2), (1) and (3) respectively, and then the cycle will be repeated with the carriers at stations (3), (2) and (1) respectively, and so on.

The stations (1), (2) and (3) are "Blank Station," "Blow Station" and "Take-Out Station" respectively as so labeled in FIG. 1. "Transfer" is the movement of the turret so that carrier A, for instance, moves from station (1) to station (2), then from station (2) to station (3), and then from station (3) to station (1), whereupon the cycle is repeated. By way of general preliminary comments each finish ring carrier is inverted "on the fly" while being transferred from station (3) to station (1) and reverted "on the fly" during transfer from station (1) to station (2) as indicated "Invert" and "Revert" on FIG. 1.

Figure 2A:
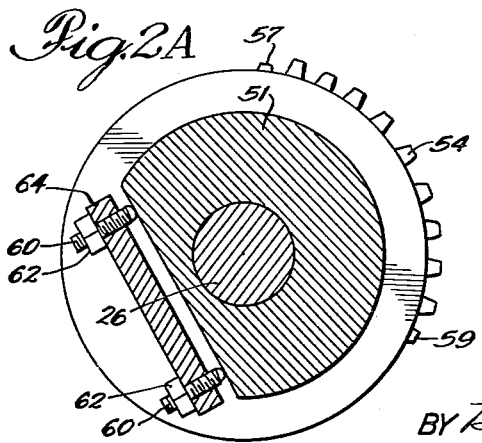
FIG. 2A is a horizontal detail sectional view on the line 2A—2A of FIG. 2.

FIG. 2 is referred to for constructional details. The case 20 is provided with a bracket 22 which supports a stationary turret-supporting shaft 26 by receiving the lower marginal end thereof which is keyed at 24 to the bracket for the purpose of providing a rigid mounting.

An indexing turret sleeve 28 is rotatable on the shaft 26 and has lower and upper bushings 30 and 32 surrounding the shaft. To further support the indexing turret sleeve 28, I provide a stationary sleeve 34 having a lower bearing 36 and an upper bearing 38 interposed between the sleeves 34 and 28.

A turret head 40 in the form of a collar is keyed to the sleeve 28 adjacent the upper end thereof, the key being shown at 42, and a lock nut 43 is provided to make the connection more rigid and confine the inner race of the bearing 38 on the sleeve 28. A lock nut 37 is also provided for the bearing 36.

The turret head 40 has three finish ring carrier studs 44 extending horizontally and radially therefrom 120° apart and a finish ring carrier head 50 is provided on each to support the three finish rings A, B and C. The heads 50 are rotatably mounted on the studs 44 and retained thereon by finish ring index discs 46 secured to the outer ends of the studs 44 by cap screws 48.

Each finish ring carrier head 50 has a gear 52 secured thereto which are similar but are separately identified as 52(A), 52(B) and 52(C) to correspond to the respective finish ring carriers A, B and C. A stationary invert gear sector 54 is secured to the upper end of the stationary shaft 26 for successive meshing coaction with the gears 52(A), 52(B) and 52(C). A collar 64 is secured by a key 66 to the upper end of the shaft 26 and carries a pair of set screws 60 for holding the gear sector 54 in its proper rotational position yet permits slight rotational adjustment as desired in a manner obvious from an inspection of FIG. 2A. Lock nuts 62 are provided for the set screws 60 once they are adjusted. A stationary revert gear sector 56 is secured to the stationary sleeve 34 adjacent its upper end, also for successive meshing coaction with the three gears 52(A), 52(B) and 52(C). The gear sectors 54 and 56 have portions 61 and 63 respectively devoid of teeth and having a circumferential extent of about 240° each.

The gears 52 are of bevel type and so are the gear sectors 54 and 56, but their teeth are mutilated as illustrated in FIG. 4, those on 52 having two opposite teeth 53 cut about half off and two opposite teeth 55 likewise cut about half off. The gear sectors 54 and 56 have their end teeth cut about half off at 57 and 59 for clearance relative to the teeth 53 and 55 as will hereinafter appear. It will be noted that the teeth of the gear sectors 54 and 56 are circumferentially staggered relative to each other, the sector 54 extending from the "Take-Out Station" at the top of FIG. 1 to the "Blank Station" and the sector 56 extending from the "Blank Station" to the "Blow Station."

FIG. 4 illustrates the gear teeth as viewed when looking inward toward the center of the stationary shaft 26 so that the gears 52 travel toward the left and accordingly 52(A) will rotate clockwise on its axis during the first 120°, counterclockwise during the second 120° and will remain stationary during the third 120° which represents the full 360° of rotation of the turret T, and the gears 52(B) and 52(C) are likewise intermittently rotated as the turret rotates.

For accomplishing the indexing of the turret T, I provide a hydraulic indexing motor 70 (FIG. 2) of the oscillating type with oscillation of substantially 120°. I connect and disconnect this motor with respect to the indexing sleeve 28 by means of a motor shaft 72 having a disc 74 connected by cap screws 76 to a second disc 77 having an arm 84 terminating in an index pin carrier 78. The carrier 78 is bushed at 80 for oscillation relative to the stationary shaft 26 and is located within a drum 82 on the lower end of the indexing turret sleeve 28.

An index pin 86 is slidably carried in a bushing 88 of the carrier 78 and is normally in the extended position of FIG. 2 under the action of an index pin spring 90. A stop screw 92 extends from the carrier 78 and into a stop slot 94 of the index pin 86 to limit the outward movement thereof under the action of the spring.

Three bushings 96 are carried by the drum 82 at 120° intervals (see FIG. 3) to receive successively the index pin 86. A hydraulic cylinder 98 is supported by the case 20, and a piston 100 is slidable therein. A register pin 102 extends from the piston and is adapted to enter any one of the three bushings 96 when they are in register therewith. The cylinder 98 has thereon a cylinder head 104.

Means is provided for actuating the piston 100 within the cylinder 98 comprising an oil valve (FIG. 2) which consists of an oil valve plunger 106 in an oil valve cylinder 108. The cylinder 108 is connected to a manifold 110 to which an oil supply line 112 extends. An oil line for extending the register pin plunger 102 is illustrated at 116 and an oil line 114 for retracting it. An oil valve plunger roller 118 is carried by the plunger 106 and the oil under pressure entering the supply pipe 112 tends to keep it in engagement with timer cams $C^1$ and $C^2$ of a timer T. The timer shaft is shown at 120 and a timer rotor at 122 on which the cams $C^1$ and $C^2$ are rotatably adjustable as to the amount one overlaps the other. Both cams coact with the roller 118 and the adjustment just mentioned is effective to change the effective cam lobe length so as to adjust the timing period for the extension and retraction of the plunger 102. The oil valve cylinder 108 is provided with a pair of return ports 117 which are connected with a suitable return (not shown) to the reservoir from which oil is pumped to the supply line 112 under suitable pressure. The extension of the register pin is indicated "In" in the cycle diagram of FIG. 7 and the retraction thereof is indicated "Out."

Referring to FIG. 5, each of the three finish ring index discs 46 is provided with a pair of index notches 124 for coaction with an index roller 128 carried by a lever 126. Each lever 126 is pivoted at 127 on its respective finish ring carrier heads 50 and a spring 130 normally forces the roller 128 into one or the other of the notches of their respective discs 46 when the finish ring is either in the inverted or the reverted position. Thus as any one of the gears 52 comes to a central position such as illustrated in FIG. 4 and "runs out of teeth" its index roller 128 biases the carrier head to its final centered position and insures that the finish ring carried by the finish ring carrier head is properly aligned vertically either inverted or reverted as the case may be.

Each finish ring carrier head 50 has a guide carrier 131 secured thereto as by cap screws 133 (FIG. 5) and a guide 132 projects from opposite sides thereof. These guides are splined and are held against rotation in the guide carriers 131 by set screws 135 (FIG. 2). A pair of finish ring carriers 134 is provided on each guide 132 and these have internally splined bosses 136 slidable and non-rotatable on the guides 132. The carriers 134 are normally in the closed position shown at stations (1) and (2) and during all three transfer periods, but at station (3) they are spread apart by means such as illustrated in the Youkers application for releasing the finished ware and dropping it a fraction of an inch on to a dead plate 140 from which the ware is pushed onto a take-away conveyor 137.

A split finish or neck ring 138 is provided for and is secured to each pair of the carriers 134. At station (1) parison mold carriers 142 are pivoted at 143 for opening and closing (shown closed in FIG. 1). A parison mold 144 is carried thereby, the mold being of split type and therefore formed in two halves. Also at station (1) is a baffle 150 carried by a baffle supporting arm 151 pivoted at 143 and also vertically slidable. A funnel 152 is carried by a funnel supporting arm 154 pivoted at 156.

Pivoted at 147, station (2), are blow mold carriers 146 supporting the halves of a blow mold 160, and the mold carriers at this station together with the molds 160 are shown in the open position. Suitable linkage 149 and operating arms 153 are shown for opening and closing the molds 144 and 160 and the baffle and funnel are operated in substantially the same manner as shown in the Youkers application.

*Practical Operation*

By way of general description each finish or neck ring 138 is caused in its turn to invert between the take-out station (3) and the blank station (1). At the blank station the parison mold 144 closes, the usual plunger mechanism (not shown) for forming the interior of the bottle neck coacts with the finish ring and the funnel 152 engages the mold. The gob of glass is then loaded into the mold through the funnel. After the funnel is removed the baffle 150 closes the blank cavity and the parison is formed by the counterblow operation, all as outlined in the cycle diagram of FIG. 7. After the formation of the parison the mechanisms mentioned in this paragraph are removed in reverse order, and the finished parison is reverted as it is being transferred from the blank station to the blow station.

The parison is indicated at P in FIG. 6, its inverted position ($P^1$) is changed to a reverted position ($P^{13}$) as illustrated, assuming the successive positions ($P^2$ through $P^{12}$) shown by dot and dash lines until the parison is completely reverted by which time the parison has arrived at blow station (2). A series of horizontally spaced dots 158 show the progression of the center of rotation of the neck ring carrier 50 in equal time intervals from 158a at station (1) to 158b at station (2) and the corresponding position of the parison P resulting from the rotation of the gear 52 as it rolls along the gear teeth of the reverting gear 56. It will be noted that the rotation of the parison is around an axis substantially midway between its upper and lower ends thus minimizing the effect of centrifugal force tending to cause the plastic glass to move toward the ends of the parison and this motion results in the neck of the ware starting slowly and gathering speed as it rotates, thus insuring more uniform ware than in those types of machines that swing the ware about an axis spaced from the parison. This pattern of revert also results in the bottom end of the parison being subjected to a decreasing rate of speed through out its successive positions ($P^1$ to $P^{13}$).

After arriving at the blow station (2) the parison is allowed to reheat while the bottom plate 162 is raised and the blow molds 160 are then closed whereupon the blow head (not shown) is engaged with the neck ring and the parison receives the final blow to change it into finished ware indicated W. The mechanisms at the blow station are then removed in the reverse order and the finished ware W is transferred by the finish ring 138 from the blow station to the take-out station (3).

The finished ware $W^1$ (FIG. 1) is suspended over the cooling dead plate 140 for a sufficient time to set up the glass. Then the dead plate is raised, the finish ring is opened, depositing the ware on the dead plate, and the dead plate is lowered with the ware while the finish ring is closing. A double dead plate is illustrated for extra cooling time, the ware $W^1$ being first transferred by a pusher (not shown) to the position $W^2$ and then by another pusher (not shown) to the position $W^3$ on the take-away conveyor 137. The conveyor 137 delivers the finished ware to the annealing lehr in the usual manner.

Referring to FIG. 4 the gear 52(A) will be rotated clockwise as soon as it starts to move in the left-hand direction and the gear 52(C) will be rotated counter-clockwise while the gear 52(B) will remain stationary during its next 120° of movement caused by intermittent rotation of the turret T. Thus each finish ring is inverted and reverted at the proper time and remains in the reverted position between stations (2) and (3) with proper overlap of the operations such that a complete 360° rotation is provided for each of the three neck rings about the vertical turret axis, with three separate deliveries of finished ware during complete rotation of the turret as in the Youkers application. With my arrangement the transfer time may be something like 86° as shown in the timing cycle chart (FIG. 7) and accordingly this is the time allotted for invert and likewise for revert. The chart referred to shows all the various operations performed during a complete cycle of one neck ring from 0° to 360° wherein 0° is represented by the position of the neck ring at the time invert commences as one neck ring leaves station (3) and revert commences as the previous one leaves station (1). The "transfer return" is the return stroke of the motor 70 after having effected transfer. The various typical operations of a glass-forming machine are shown in relation to the transfer time and of course the transfer time itself is the equivalent of the invert time between stations (3) and (1) and the revert time between stations (1) and (2) with transfer, invert and revert all occurring simultaneously.

My transfer and invert-revert method permits the time interval between loading, settle-blow, vacuum-on and counter-blow to be very short since there is no time delay in waiting for various mechanical motions to transpire. This allows the glass less time to remain idle in the parison mold 144 and therefore reduces the degree of settle-wave on the ware. The vacuum may remain on through-out the entire parison forming cycle so that good quality finishes are produced at speeds commensurate with anticipated increase in mold rates. The use of three finish rings instead of one allows for a maximum overlap of cycle i.e. ware is transferred to blank, blow mold and take-out stations simultaneously. The ware also remains in contact with the finish ring throughout the duration of the cycle which has the advantage of the ware being held in the finish ring while the blow molds are opening thus eliminating the necessity of excessive swabbing to prevent sticking, and final blowing through the ring eliminates bulged or distorted finishes. Also, there is no need for equalizing air around the finish ring during final blowing and there is a positive register of the parison in the blow mold thus reducing the possibility of off-set finishes. Thread hang-up ware such as those used on some cosmetic ware can be easily made on this type of machine.

The pattern for revert shown in FIG. 6 indicates that there is a minimum whipping motion of the parison from position $P^1$ to position $P^{13}$ and since the entire transfer time may be utilized for this reverting operation the speed of reverting is relatively slow, thus also tending to improve the ware by minimizing the action of centrifugal forces that tend to distort the parison before the blow mold is closed around it.

Some changes may be made in the construction and arrangement of the parts of my transfer and invert-revert mechanism without departing from the real spirit and purpose of my invention, and it is my intention to cover by my claims any modified forms of structure or use of mechanical equivalents which may reasonably be included within their scope.

I claim as my invention:

1. In a neck ring supporting and actuating structure for a glassware forming machine having a turret, said turret having a radially disposed pivot structure supported thereon, means for indexing said turret 120° at a time to a blank station, a blow station and a take-out station, and blank and blow molds which remain at said blank and blow stations respectively; said neck ring supporting and actuating structure being carried by said pivot structure on said turret and comprising a gear on said actuating structure and a stationary gear sector to cooperate therewith and located immediately adjacent said turret and above said gear for rotating said neck ring on said actuating structure while said neck ring travels from the take-out station to the blank station to invert only said neck ring, and a second stationary gear sector to cooperate with said gear and located immediately adjacent said turret and below said gear for rotating said neck ring and a parison formed at the blank station and carried by said neck ring on a radial axis in relation to the index axis while they travel from the blank station to the blow station to revert only said neck ring and such parison, the direction of rotation corresponding to the direction of movement of said neck ring and the parison from said blank station to said blow station, the neck ring supporting and actuating structure being constructed and arranged to substantially center said parison with respect to the axis of the pivot structure, and detent means to cooperate with said neck ring supporting and actuating structure and located immediately adjacent said turret to prevent such rotation of said neck ring and the ware blown at the blow station while said neck ring and such ware travel from the blow station to the take-out station, said neck ring being carried by said actuating structure as closely adjacent the axis of rotation thereof on said turret as permitted by the presence of said actuating structure itself plus said gears and sectors and said detent means.

2. In a three neck ring supporting and actuating structure for a glassware forming machine having a turret, said turret carrying a radially disposed pivot structure, means for indexing said turret 120° at a time to three stations, namely, a blank station, a blow station and a take-out station, and blank and blow molds which remain at said blank and blow stations respectively; said neck ring supporting and actuating structure being carried by said pivot structure for rotation thereabout and comprising a gear on said actuating structure for each neck ring and a pair of stationary gear sectors immediately adjacent said turret for cooperating with said gears for rotating said neck rings on said actuating structure while said neck rings travel successively from the take-out station to the blank station to invert only said neck rings, and for rotating said neck rings and parisons formed at the blank station and carried by said neck rings while they travel from the blank station to the blow station to revert only said neck rings and such parisons, one of said stationary gear sectors being above said neck ring gears for inverting said neck rings and the other below said neck ring gears for reverting said neck rings and the parisons carried thereby in a direction of rotation opposite the direction when inverting, the gear sector for inverting having teeth meshing with said neck ring gears only between the take-out station and the blank station, said teeth being above said neck ring gears to cause invert in one direction, the gear sector for reverting having teeth meshing with said neck ring gears only between the blank station and the blow station, said teeth being below said neck ring gears to cause revert in the opposite direction and in such manner that a parison carried by a neck ring in substantially centered relationship with respect to the axis of the pivot structure is reverted on an axis at substantially the center of the parison and with a relatively slow start and a fast finish for the movement of the neck of the parison during revert, and compact means adjacent said turret to prevent such rotation of said neck rings and the ware blown at the blow station while said neck rings and such ware travel from the blow station to the take-out station, said neck rings being carried by said actuating structure as closely adjacent the axis of rotation thereof on said turret as the presence of said actuating structure itself plus said gears, said sectors and said means to prevent such rotation will permit.

3. In a three neck ring supporting and actuating structure for a glassware forming machine having a turret, said turret having a radially disposed pivot structure thereon, means for indexing said turret 120° at a time to three stations, namely, a blank station, a blow station and a take-out station, and blank and blow molds which remain at said blank and blow stations respectively; said neck ring supporting and actuating structure being carried by said pivot structure on the turret and comprising compact gear and gear sector means immediately adjacent said turret for rotating said neck rings on said actuating structure while said neck rings travel from the take-out station to the blank station to invert only said neck rings, and for rotating said neck rings and parisons formed at the blank station and carried and solely supported by said neck rings during revert while they travel from the blank station to the blow station to revert only said neck rings and such parisons, the direction of revert being the same as the direction of rotation of said turret and the direction of invert being opposite said direction of rotation of said turret, the axes of such parisons being as close to the axis of said turret as said gear and gear sector means will permit, and the revert rotation being spread to cover substantially the entire indexing of said turret, the parison being substantially centered with respect to the axis of the pivot structure, whereby such parison is reverted with a minimum of exposure to centrifugal force because of the center of rotation of said neck ring being substantially at the center midway between the top and bottom of such parison during substantially the entire indexing period and the neck ring is swung from below said center to above said center and with a gradually increasing rate of speed, while the bottom of the parison is swung from above said center to below said center and with a gradually decreasing rate of speed.

References Cited in the file of this patent
UNITED STATES PATENTS

| | | |
|---|---|---|
| 1,056,579 | Proeger | Mar. 18, 1913 |
| 1,836,646 | Crile | Dec. 15, 1931 |
| 1,865,967 | Schoonenberg | July 5, 1932 |
| 2,013,463 | Headley et al. | Sept. 3, 1935 |
| 2,026,225 | Eckert | Dec. 31, 1935 |
| 2,111,296 | O'Neill | Mar. 15, 1938 |
| 2,874,516 | Youkers | Feb. 24, 1959 |
| 2,918,756 | Mumford | Dec. 29, 1959 |